(12) United States Patent
Kamatani

(10) Patent No.: US 9,983,503 B2
(45) Date of Patent: May 29, 2018

(54) SEMICONDUCTOR LASER DRIVER AND IMAGE FORMING APPARATUS INCORPORATING SAME

(71) Applicant: Tomohiko Kamatani, Osaka (JP)

(72) Inventor: Tomohiko Kamatani, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/405,705

(22) Filed: Jan. 13, 2017

(65) Prior Publication Data
US 2017/0219951 A1     Aug. 3, 2017

(30) Foreign Application Priority Data

Feb. 1, 2016  (JP) .................................. 2016-017010

(51) Int. Cl.
| | |
|---|---|
| *G03G 15/043* | (2006.01) |
| *H04N 1/29* | (2006.01) |
| *H04N 1/40* | (2006.01) |
| *G03G 15/04* | (2006.01) |
| *H04N 1/401* | (2006.01) |

(52) U.S. Cl.
CPC ..... *G03G 15/043* (2013.01); *G03G 15/04072* (2013.01); *H04N 1/295* (2013.01); *H04N 1/4015* (2013.01); *H04N 1/40031* (2013.01); *H04N 1/40037* (2013.01)

(58) Field of Classification Search
CPC . B41J 2/451; G03G 15/043; G03G 15/04072; H04N 2201/04731; H04N 2201/04748; H04N 2201/04791; H04N 1/4015; H04N 1/40031; H04N 1/40037; H04N 1/295
See application file for complete search history.

(56) References Cited

U.S. PATENT DOCUMENTS

| | | | |
|---|---|---|---|
| 2010/0239288 A1 | 9/2010 | Ohyama | |
| 2011/0032323 A1 | 2/2011 | Yamashita et al. | |
| 2013/0106973 A1* | 5/2013 | Furuta | G03G 15/5058 347/118 |

FOREIGN PATENT DOCUMENTS

| | | |
|---|---|---|
| JP | 2010-241125 | 10/2010 |
| JP | 2011-034002 | 2/2011 |
| JP | 2011-088277 | 5/2011 |

\* cited by examiner

*Primary Examiner* — Kristal Feggins
(74) *Attorney, Agent, or Firm* — Oblon, McClelland, Maier & Neustadt, L.L.P.

(57) ABSTRACT

A semiconductor laser driver and an image forming apparatus incorporating the semiconductor laser driver. The semiconductor laser driver includes a light source including a plurality of laser-beam source units disposed in a sub-scanning direction that serves as a group direction, the laser-beam source units having a plurality of groups arranged in a main scanning direction, each of the laser-beam source units emitting a laser beam of a light quantity dependent upon a driving current, a shading corrector to correct, according to at least one shading correction value, the driving current given to the laser-beam source units for each of the groups, and a light quantity adjuster to adjust the driving current according to a light-quantity adjustment value for the laser-beam source units. The image forming apparatus includes a semiconductor laser drive circuit, and the semiconductor laser driver that serves as the semiconductor laser driver.

12 Claims, 8 Drawing Sheets

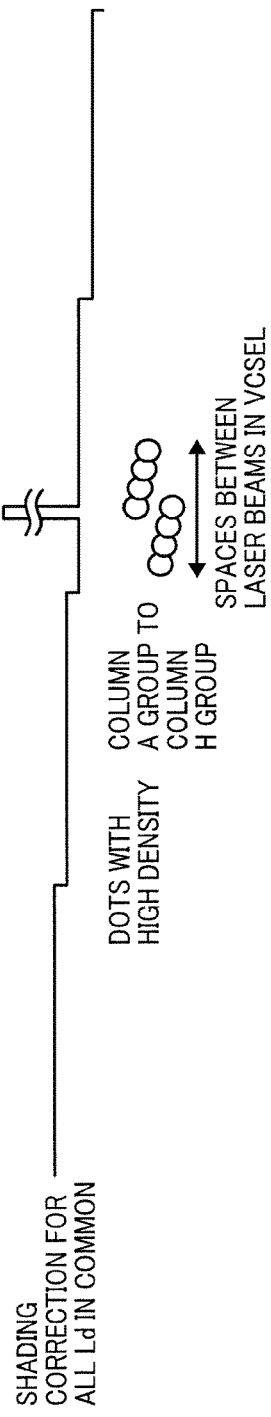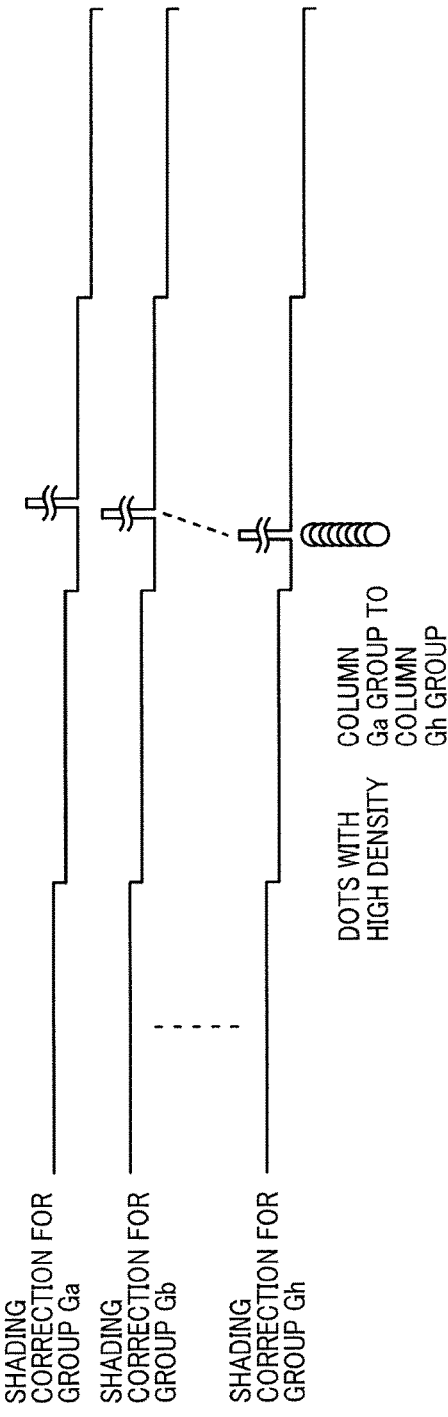

SEMICONDUCTOR LASER DRIVER AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2016-017010, filed on Feb. 1, 2016, in the Japan Patent Office, the entire disclosure of which is hereby incorporated by reference herein.

BACKGROUND

Technical Field

Embodiments of the present invention relate to a semiconductor laser driver and an image forming apparatus incorporating the same.

Background Art

As known in the art, electrophotographic image forming apparatuses use a semiconductor laser driver to drive a semiconductor laser, and irradiate an evenly charged photoconductor with a laser beam that is modulated according to image data. By so doing, an electrostatic latent image is formed on the surface of the photoconductor. The image forming apparatuses apply developer such as toner to the photoconductor to develop the electrostatic latent image, and then transfer the developed toner image to a recording medium such as a sheet of paper. Accordingly, an image is formed.

In such electrophotographic image forming apparatuses, as known in the art, the mounted semiconductor laser driver is provided with an automatic power control (APC) circuit. The semiconductor laser driver uses the APC circuit to control an adjustment current to adjust a driving circuit for a laser beam source according to an adjustment value for adjusting the light quantity of laser beam source to drive the laser beam source with a desired light quantity. This series of processes is referred to as APC processes.

In the image forming apparatuses, the image quality deteriorates due to optical variations or variations in electrical charge on the photoconductor. In order to handle such a situation, a semiconductor laser driver performs shading correction to correct such optical variations or variations in electrical charge on the photoconductor. The term "optical variation" indicates that the laser beam emitted from a laser beam source to a surface to be exposed, with an even light quantity, becomes uneven in light quantity due to the characteristics of a deflection element or lens which are arranged in between the laser beam source to the surface to be exposed. As known in the art, the semiconductor laser driver performs shading correction mainly by controlling the driving current (switching current) on the image area.

In recent years, image forming apparatuses are provided with a laser-beam source where a plurality of laser-beam source units such as vertical-cavity surface-emitting lasers (VCSEL) are arranged in the main scanning direction and the sub-scanning direction.

SUMMARY

Embodiments of the present invention described herein provide a semiconductor laser driver and an image forming apparatus incorporating the semiconductor laser driver. The semiconductor laser driver includes a light source including a plurality of laser-beam source units disposed in a sub-scanning direction that serves as a group direction, the laser-beam source units having a plurality of groups arranged in a main scanning direction, each of the laser-beam source units emitting a laser beam of a light quantity dependent upon a driving current, a shading corrector to correct, according to at least one shading correction value, the driving current given to the laser-beam source units for each of the groups, and a light quantity adjuster to adjust the driving current according to a light-quantity adjustment value for the laser-beam source units. The image forming apparatus includes a semiconductor laser drive circuit to form an image by irradiating a photoconductor with laser beam according to image data, and the semiconductor laser driver that serves as the semiconductor laser driver.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 5 is a diagram illustrating dot misalignment caused when shading correction is performed for all the laser beam sources at a common timing.

FIG. 6 is a diagram illustrating dot misalignment caused when shading correction is performed for each group, according to an embodiment of the present invention.

Figure 1:
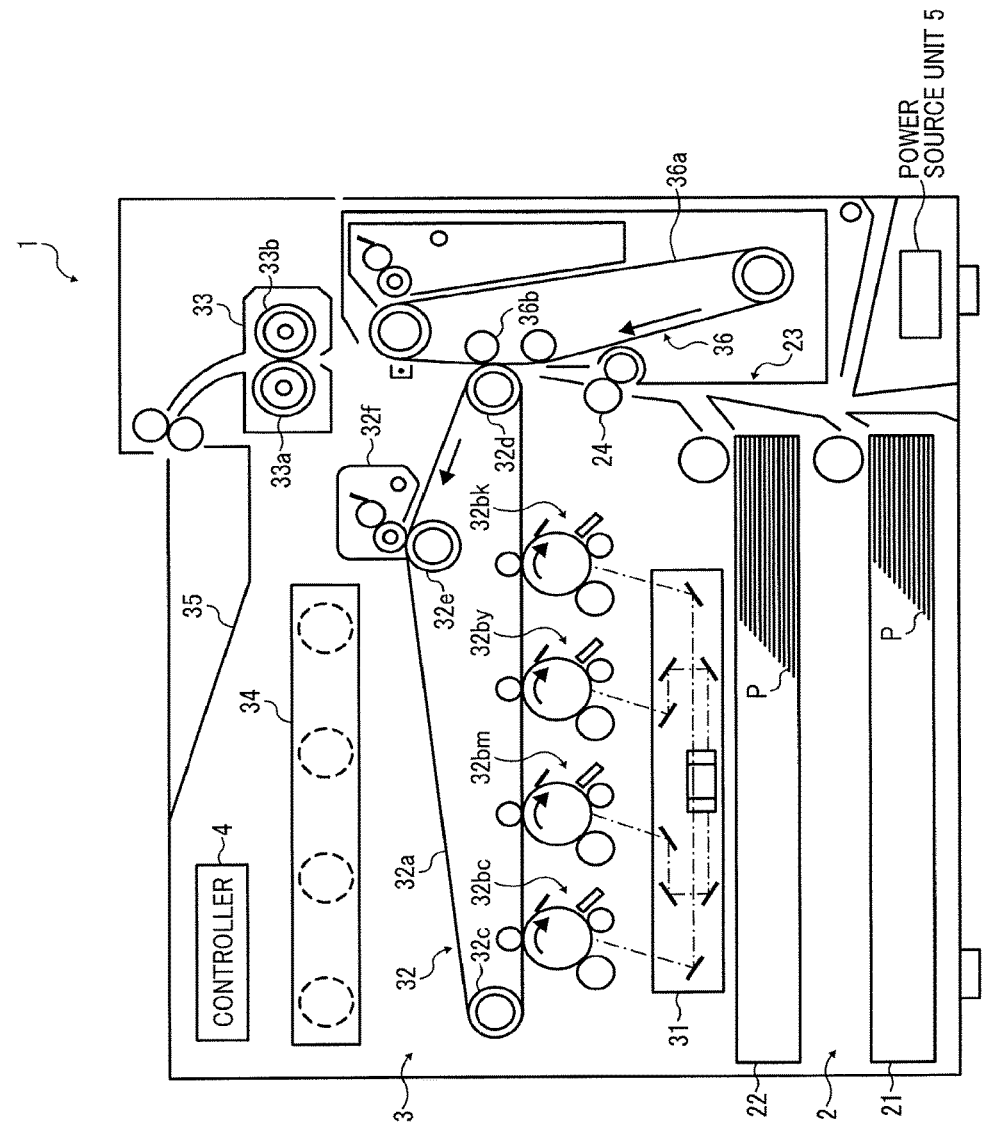
FIG. 1 is a schematic diagram of the configuration of an image forming apparatus according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present invention are described below in detail with reference to the drawings.

First Example

FIG. 1 to FIG. 6 are diagrams illustrating a semiconductor laser driver and an image forming apparatus provided with the semiconductor laser driver, according to a first embodiment of the present invention.

FIG. 1 is a schematic diagram of the configuration of an image forming apparatus 1 provided with a semiconductor laser driver, according to the present embodiment.

Figure 2:
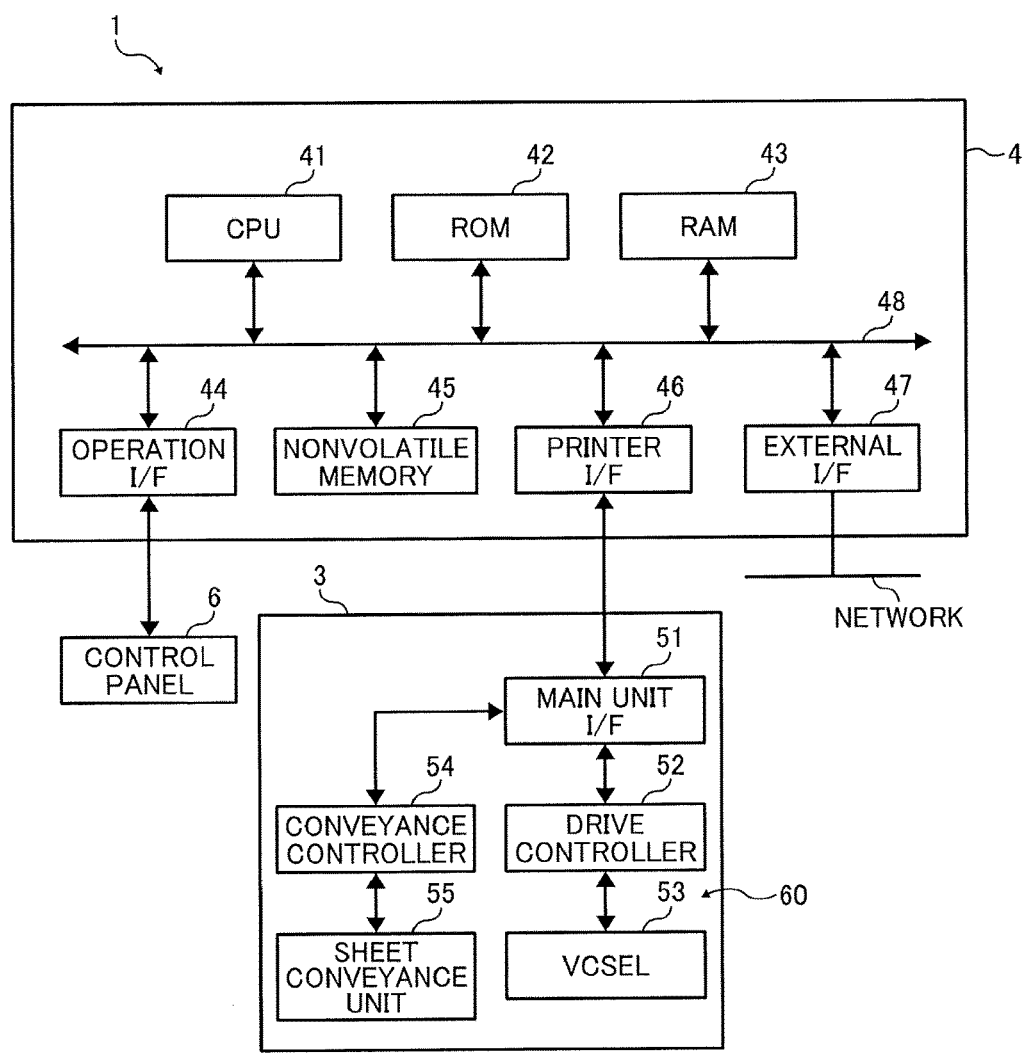
FIG. 2 is a schematic block diagram of the image forming apparatus of FIG. 1.

As illustrated in FIG. 1, the image forming apparatus 1 includes, for example, a sheet feeder unit 2, a printer unit 3, a controller 4, a power source unit 5, and a control panel 6 (see FIG. 2).

FIG. 2 is a schematic block diagram of the image forming apparatus 1 according to the present embodiment. The image forming apparatus 1 may include a scanner unit and an automatic document feeder (ADF).

As illustrated in FIG. 1, the sheet feeder unit 2 is provided with, for example, a plurality of sheet feeding trays 21 and 22, and a conveyance unit 23, and sheets of paper P with various types of size (recording medium) are stored in the sheet feeding trays 21 and 22 in a desired sheet feeding direction.

The printer unit 3 is a full-color printer unit of four-drum system (tandem system), and provided with, for example, a laser writing unit 31, an image forming unit 32, a fixing unit 33, a storage 34. The printer unit 3 uses the image forming unit 32 to form an image on the top surface of the sheet of paper P, which is conveyed by the conveyance unit 23 from the sheet feeding trays 21 and 22 of the sheet feeder unit 2, and then uses the fixing unit 33 to fix the image and sends out the sheet of paper P to an output tray 35 arranged inside the main unit.

In the image forming unit 32, image forming units 32bc, 32bm, 32by, and 32bk of cyan (C), magenta (M), yellow (Y), and black (B), respectively, are sequentially disposed along a first seamless transfer belt 32a. The first seamless transfer belt 32a is stretched over a pair of support roller 32c and 32d, and a tension roller 32e, and is driven to rotate in the direction indicated by the arrow in FIG. 1. The image forming units 32bc, 32bm, 32by, and 32bk are disposed between the pair of support rollers 32c and 32d. The tension roller 32e is provided with a transfer material cleaning unit 32f that removes residual toner remaining on the first seamless transfer belt 32a. For each of the image forming units 32bc, 32bm, 32by, and 32bk, a charging roller disposed around the photoconductor to evenly charge the photoconductor that rotates in the direction as indicated by the arrows in FIG. 1, a development unit that supplies toner, and a transfer roller that sequentially superimposes the toner image of the photoconductor on top of one another on the first seamless transfer belt 32a to perform transfer processes are provided. In each of the image forming units 32bc, 32bm, 32by, and 32bk, the photoconductor, which is evenly charged by the charging roller, is irradiated with the laser beams from the laser writing unit 31 that are modulated according to the image data of each color, and an electrostatic latent image is formed. The image forming unit 32 supplies toner of the corresponding color from the development unit to the photoconductor on which the electrostatic latent image has been formed, and form a toner image of the corresponding color on the photoconductor. Subsequently, the image forming unit 32 uses the transfer roller to sequentially superimpose the toner images on top of one another on the first seamless transfer belt 32a and performs the transfer processes. Accordingly, a color toner image is formed. Note also that the image forming unit 32 may use only the image forming unit 32bk of black to form a monochrome image. As will be described later, a vertical-cavity surface-emitting laser (VCSEL) 53 (see FIG. 2 and FIG. 3) is used as the laser writing unit 31.

As illustrated in FIG. 1, on the right side of the first seamless transfer belt 32a, a second transfer belt 36a of a secondary transfer unit 36 is disposed. In the secondary transfer unit 36, a secondary transfer roller 36b is disposed so as to face a support roller 32d across the first seamless transfer belt 32a and the second transfer belt 36a. In the image forming unit 32, the sheet of paper P is fed between the first seamless transfer belt 32a and the second transfer belt 36a from the sheet feeder unit 2 at the timing adjusted by a registration roller pair 24.

Note also that the second transfer belt 36a is supported and stretched by a support roller and a drive roller so as to be movable in a direction indicated by arrow.

The image forming unit 32 uses transfer voltage applied by the secondary transfer roller 36b to transfer the color toner image on the first seamless transfer belt 32a to the sheet of paper P that has been conveyed to between the first seamless transfer belt 32a and the second transfer belt 36a, and the second transfer belt 36a conveys the sheet of paper P to which the toner image has been transferred to fixing unit 33.

The fixing unit 33 includes, for example, a fixing roller 33a that is heated by a fixing heater to a desired fixing temperature, and a pressure roller 33b that is pressed against the fixing roller 33a with prescribed pressure and rotates together with the fixing roller 33a. The fixing unit 33 conveys the sheet of paper P to which the toner image has been transferred, which has been conveyed to between the pressure roller 33b and the fixing roller 33a that has been heated to the desired fixing temperature by the fixing heater, while pressurizing and heating the sheet of paper P. By so doing, the toner image is fixed onto the sheet of paper P. Then, fixing unit 33 sends out the sheet of paper P on which the toner image has been fixed to the output tray 35.

Note also that in FIG. 1, supply toner of each color is stored in the storage 34, and the toner of each color stored in the storage 34 is carried by a powder pump to the development unit of the corresponding color of the image forming units 32bc, 32bm, 32by, and 32bk.

As illustrated in FIG. 1, in the image forming apparatus 1, the printer unit 3, the controller 4, and the control panel 6 (see FIG. 2) are in block structure. The image forming apparatus 1 also includes the sheet feeder unit 2 as described above, the power source unit 5, or the like.

As illustrated in FIG. 2, the controller 4 includes, for example, a central processing unit (CPU) 41, a read-only memory (ROM) 42, a random access memory (RAM) 43, an operation interface (I/F) 44, a nonvolatile memory 45, a printer interface (I/F) 46, and an external interface (I/F) 47. In the controller 4, the elements are coupled to each other via a bus 48.

The printer unit 3 includes, for example, a main unit interface (I/F) 51, a drive controller 52, vertical-cavity surface-emitting lasers (VCSEL) 53, a conveyance controller 54, and a sheet conveyance unit 55. The drive controller 52 and the VCSEL 53 together configure a semiconductor laser driver 60 that controls the operation of the VCSEL 53.

The power source unit 5 generates alternating current and direct current to be used internally by the image forming apparatus 1 from an external commercial power, and supplies each element such as the controller 4 and the printer unit 3 with required power.

Firstly, the controller 4 is described. The ROM 42 stores a basic program for the image forming apparatus 1. In particular, the ROM 42 stores a semiconductor-laser operation control program or other necessary data.

The CPU 41 uses the RAM 43 as a working memory based on a program stored in the ROM 42, and controls the elements of the image forming apparatus 1 to control the basic operation of the image forming apparatus 1. The CPU 41 also controls the operation of the semiconductor laser driver 60.

While the RAM 43 is not only used as a working memory of the CPU 41, but also used as a page memory where the drawing data of one page for forming an image in the printer unit 3 is developed.

To the operation interface 44, the control panel 6 is coupled.

The control panel 6 includes, for example, control keys for performing various kinds of operation, a display on which the detail of the operation or various kinds of information provided from the image forming apparatus 1 to the user is displayed, and various kinds of buttons or light-emitting diodes (LEDs).

The operation interface 44 obtains the detail of the various kinds of operation on the control panel 6, and notifies the CPU 41 of the obtained information. Subsequently, the operation interface 44 passes the information to be displayed given from the CPU 41 to the control panel 6 so as to be displayed on the display.

The nonvolatile memory 45 maintains the stored contents of data even while the image forming apparatus 1 is turned off, and stores, for example, received or read image data, and other various kinds of data.

The printer interface 46 is coupled to the main unit interface 51 of the printer unit 3, and exchanges data such as drawing data, a setting control signal, and a processing status signal.

The external interface 47 is connected to the network NW that is connected to a host device such as a computer, and performs exchange of data or the like with the host device under the control of the CPU 41.

The CPU 41 controls the printer unit 3 to output sheets of paper on which image is printed based on the image data received from the host device via the external interface 47 or the image data scanned by a scanner.

Next, the printer unit 3 is described. The main unit interface 51 is connected to the printer interface 46 of the controller 4, and exchanges data such as drawing data, a setting control signal, and a processing status signal with the printer interface 46.

The conveyance controller 54 controls the rotation of the photoconductors of the image forming units 32*bc*, 32*bm*, 32*by*, and 32*bk*, and controls the operation of the sheet conveyance unit 55. The sheet conveyance unit 55 drives, for example, the support rollers 32*c* and 32*d* of the image forming units 32*bc*, 32*bm*, 32*by*, and 32*bk*, and the secondary transfer roller 36*b* of the secondary transfer unit 36.

The drive controller 52 controls the operation of the VCSEL 53 according to the various kinds of driving signals sent from the controller 4 via the main unit interface 51.

Figure 3:
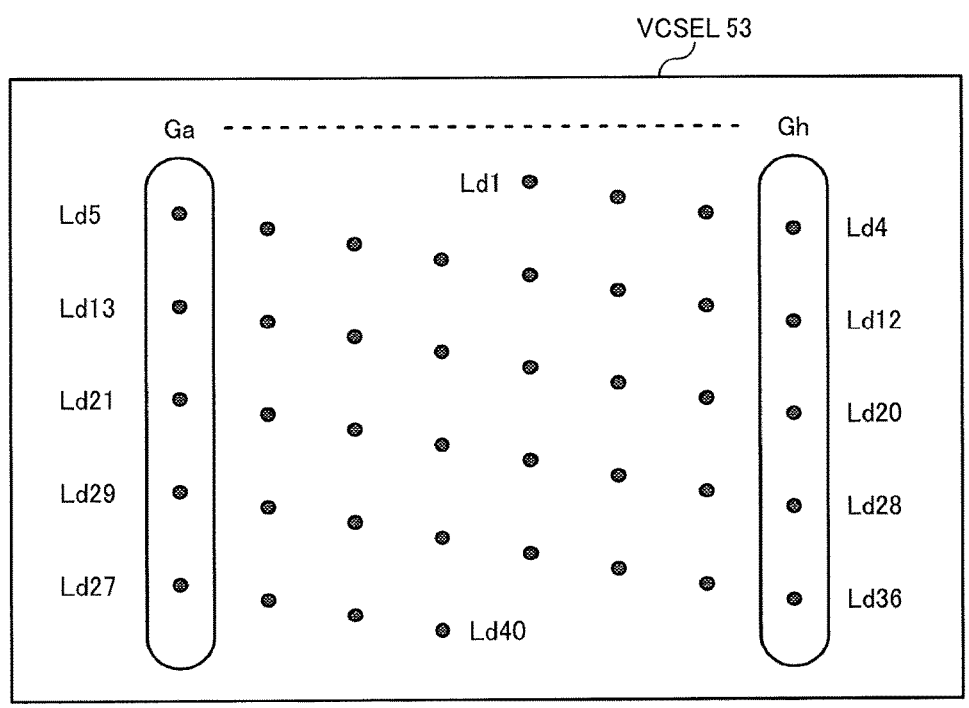
FIG. 3 is a plan view of VCSEL according to an embodiment of the present invention.

FIG. 3 is a plan view of the VCSEL 53 according to the present embodiment. The VCSEL (light source) 53 is a surface-emitting semiconductor laser where a plurality of light sources (semiconductor lasers) are disposed on the same semiconductor chip in a grid pattern. As illustrated in FIG. 3, for example, in the VCSEL 53, a plurality of laser-beam source units Ld1 to Ld40 are disposed in an oblique grid pattern.

The laser-beam source units Ld1 to Ld40 are disposed inside the laser writing unit 31, and the number of laser beams emitted from the laser-beam source units Ld1 to Ld40 corresponds to the number of colors. The laser beams that are emitted from the laser-beam source units Ld1 to Ld40 are deflected by a polygon mirror, and then reflected by a reflecting mirror. Subsequently, the reflected laser beams are collected and condensed by a cylindrical lens, and then emitted to the photoconductor drum.

As illustrated in FIG. 3, the laser-beam source units Ld1 to Ld40 of the VCSEL 53 are two-dimensionally arranged in the main scanning direction and the sub-scanning direction. In other words, the laser-beam source units Ld1 to Ld4, Ld5 to Ld12, Ld13 to Ld20, Ld21 to Ld28, Ld29 to Ld36, and Ld37 to Ld40 are aligned in the main scanning direction, and are disposed in the sub-scanning direction for each one of groups Ga to Gh. In FIG. 3, each of the groups Ga and Gh is solid-line encircled. In other words, the sub-scanning direction serves as a channel direction (group direction) in FIG. 3. The multiple laser-beam source units Ld1 to Ld40 are disposed in the channel direction, and a plurality of channels (groups) of the laser-beam source units Ld1 to Ld40 are disposed in the main scanning direction. In the present embodiment, the term "channel" indicates a group, and these channels are referred to as groups Ga to Gh, respectively. To the group Ga, the laser-beam source units Ld5, Ld13, Ld21, Ld29, and Ld37 belong. To the group Gb, the laser-beam source units Ld6, Ld14, Ld22, Ld30, and Ld38 belong. To the group Gc, the laser-beam source units Ld7, Ld15, Ld23, Ld31, and Ld39 belong. To the group Gd, the laser-beam source units Ld8, Ld16, Ld24, Ld32, and Ld40 belong. To the group Ge, the laser-beam source units Ld1, Ld9, Ld17, Ld25, and Ld33 belong. To the group Gf, the laser-beam source units Ld2, Ld10, Ld18, Ld26, and Ld34 belong. To the group Gf, the laser-beam source units Ld3, Ld11, Ld19, Ld27, and Ld35 belong. To the group Gh, the laser-beam source units Ld4, Ld12, Ld20, Ld28, Ld29, and Ld36 belong.

Figure 4:
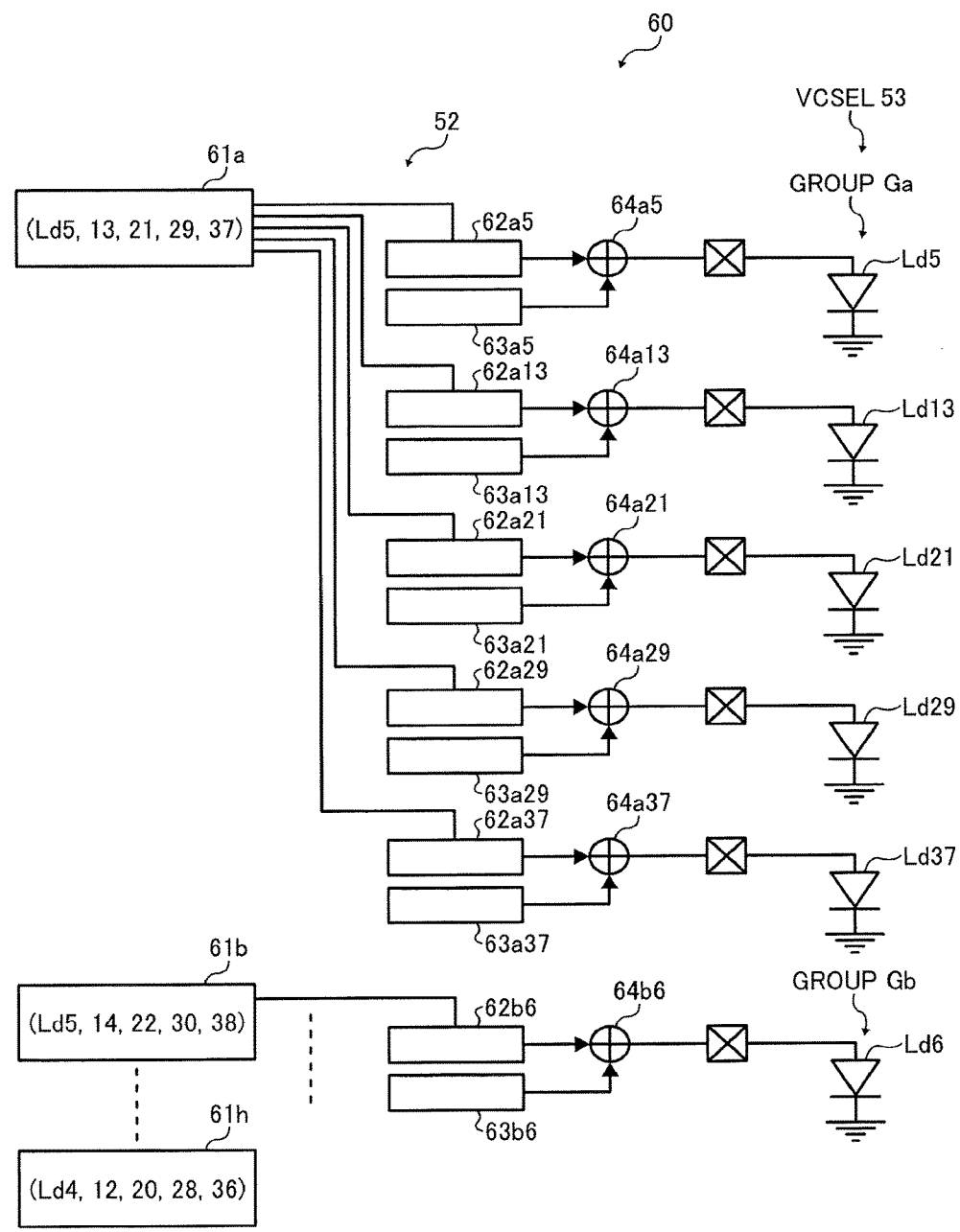
FIG. 4 is a schematic circuit diagram of a semiconductor laser driver according to an embodiment of the present invention.

FIG. 4 is a schematic circuit diagram of the semiconductor laser driver 60 according to the present embodiment. As illustrated in FIG. 4, the semiconductor laser driver 60 is circuitry, and the laser-beam source units Ld1 to Ld40 of the VCSEL 53 are driven by the drive controller 52. The drive controller 52 includes group correction-current generators 61*a* to 61*h* for the groups Ga to Gh, respectively. Moreover, the drive controller 52 includes, for example, for the respective laser-beam source units Ld1 to Ld40, individual reference-current generation correctors 62*a*5, 62*a*13, 62*a*21, 62*a*29, 62*a*37, . . . , 62*h*4, 62*h*12, 62*h*20, 62*h*28, and 62*h*36, individual adjustment current generators 63*a*5, 63*a*13, 63*a*21, 63*a*29, 63*a*37, . . . , 63*h*4, 63*h*12, 63*h*20, 63*h*28, and 63*h*36, and individual adder circuits 64*a*5, 64*a*13, 64*a*21, 64*a*29, 64*a*37, . . . , 64*h*4, 64*h*12, 64*h*20, 64*h*28, and 64*h*36.

Each of the group correction-current generators 61*a* to 61*h* outputs shading correction current to the individual reference-current generation correctors 62*a*5, 62*a*13, 62*a*21, 62*a*29, 62*a*37, . . . , 62*h*4, 62*h*12, 62*h*20, 62*h*28, and 62*h*36 that belong to the corresponding one of the groups Ga to Gh. Here, the level of the shading correction current is determined according to a shading-correction value prescribed for each of the laser-beam source units Ld1 to Ld40 that belong to the corresponding one of the groups Ga to Gh.

The individual reference-current generation correctors 62*a*5, 62*a*13, 62*a*21, 62*a*29, 62*a*37, . . . , 62*h*4, 62*h*12, 62*h*20, 62*h*28, and 62*h*36 generate reference current for the respective laser-beam source units Ld1 to Ld40 according to the image data. Moreover, the individual reference-current generation correctors 62*a*5, 62*a*13, 62*a*21, 62*a*29, 62*a*37, . . . , 62*h*4, 62*h*12, 62*h*20, 62*h*28, and 62*h*36 correct the reference current according to the shading correction current output from the group correction-current generators 61*a* to 61*h*. The individual reference-current generation correctors 62*a*5, 62*a*13, 62*a*21, 62*a*29, 62*a*37, . . . , 62*h*4, 62*h*12, 62*h*20, 62*h*28, and 62*h*36 output the shading-corrected reference current to the individual adder circuits 64*a*5, 64*a*13, 64*a*21, 64*a*29, 64*a*37, . . . , 64*h*4, 64*h*12, 64*h*20, 64*h*28, and 64*h*36, respectively. Accordingly, the group correction-current generators 61*a* to 61*h* and the individual reference-current generation correctors 62*a*5, 62*a*13, 62*a*21, 62*a*29, 62*a*37, . . . , 62*h*4, 62*h*12, 62*h*20, 62*h*28, and 62*h*36 serves as a shading corrector as a whole.

The individual adjustment current generators 63*a*5, 63*a*13, 63*a*21, 63*a*29, 63*a*37, . . . , 63*h*4, 63*h*12, 63*h*20, 63*h*28, and 63*h*36 generates adjustment current according to an adjustment value for adjusting the quantity of light to be emitted from the corresponding one of the laser-beam source units Ld1 to Ld40. The individual adjustment current generators 63*a*5, 63*a*13, 63*a*21, 63*a*29, 63*a*37, . . . , 63*h*4, 63*h*12, 63*h*20, 63*h*28, and 63*h*36 outputs the adjustment current to the corresponding one of the individual adder circuits 64*a*5, 64*a*13, 64*a*21, 64*a*29, 64*a*37, . . . , 64*h*4, 64*h*12, 64*h*20, 64*h*28, and 64*h*36.

Each of the individual adder circuits 64*a*5, 64*a*13, 64*a*21, 64*a*29, 64*a*37, . . . , 64*h*4, 64*h*12, 64*h*20, 64*h*28, and 64*h*36 adds the adjustment current generated by the corresponding one of the individual adjustment current generators 63*a*5, 63*a*13, 63*a*21, 63*a*29, 63*a*37, . . . , 63*h*4, 63*h*12, 63*h*20, 63*h*28, and 63*h*36 to the shading-corrected reference current generated by the corresponding one of the individual reference-current generation correctors 62*a*5, 62*a*13, 62*a*21, 62*a*29, 62*a*37, . . . , 62*h*4, 62*h*12, 62*h*20, 62*h*28, and 62*h*36. Then, each of the individual adder circuits 64*a*5, 64*a*13, 64*a*21, 64*a*29, 64*a*37, . . . , 64*h*4, 64*h*12, 64*h*20, 64*h*28, and 64*h*36 supplies the resultant current to the corresponding one of the laser-beam source units Ld1 to Ld40, as a final driving current.

Accordingly, the individual adjustment current generators 63*a*5, 63*a*13, 63*a*21, 63*a*29, 63*a*37, . . . , 63*h*4, 63*h*12, 63*h*20, 63*h*28, and 63*h*36, and the individual adder circuits 64*a*5, 64*a*13, 64*a*21, 64*a*29, 64*a*37, . . . , 64*h*4, 64*h*12, 64*h*20, 64*h*28, and 64*h*36 serves as a light quantity adjuster as a whole.

Next, effects of the present embodiment are described. As described above, in the image forming apparatus 1 according to the present embodiment, the semiconductor laser driver 60 performs shading correction to prevent vertical stripes, and can also reduce the cost.

The image forming apparatus 1 has the function of automatic power control (APC), and obtains a control value for APC at a desired timing under the control of the CPU 41 and stores the obtained control value in the memory of the drive controller 52. Moreover, the image forming apparatus 1 has the function of shading correction, and performs a shading correction value acquisition process at a desired timing under the control of the CPU 41 and stores the obtained shading correction value in the memory of the drive controller 52.

When the image forming apparatus 1 forms an image, the CPU 41 of the controller 4 generates a control signal and drawing data, whose image can be formed by the printer unit 3, from the image data read by a scanner or the externally-received image data, and passes the generated control signal and drawing data to the main unit interface 51 via the printer interface 46.

In the printer unit 3, the conveyance controller 54 controls the sheet conveyance unit 55 to control the conveyance of the sheet of paper P.

In the semiconductor laser driver 60, the drive controller 52 generates a reference driving current for each of the laser-beam source units Ld1 to Ld40 according to the drawing data that serves as image data, and corrects the generated reference driving current according to an APC value and shading correction value.

In order to perform shading correction in a state where the vertical stripes are prevented from occurring, as illustrated in FIG. 3 and FIG. 4, the semiconductor laser driver 60 perform shading correction upon classifying the laser-beam source units Ld1 to Ld40 into the groups Ga to Gh.

In other words, in the semiconductor laser driver 60, as illustrated in FIG. 3, the laser-beam source units Ld1 to Ld40 are arranged in an oblique grid pattern, and are classified into the groups Ga to Gh for each column of laser-beam source units aligned in the sub-scanning direction.

Moreover, in the semiconductor laser driver 60, the drive controller 52 is arranged as illustrated in FIG. 4. More specifically, as illustrated in FIG. 4, for the respective laser-beam source units Ld1 to Ld40, the individual reference-current generation correctors 62*a*5, 62*a*13, 62*a*21, 62*a*29, 62*a*37, . . . , 62*h*4, 62*h*12, 62*h*20, 62*h*28, and 62*h*36, the individual adjustment current generators 63*a*5, 63*a*13, 63*a*21, 63*a*29, 63*a*37, . . . , 63*h*4, 63*h*12, 63*h*20, 63*h*28, and 63*h*36, and the individual adder circuits 64*a*5, 64*a*13, 64*a*21, 64*a*29, 64*a*37, . . . , 64*h*4, 64*h*12, 64*h*20, 64*h*28, and 64*h*36 are arranged.

These elements are classified into the groups Ga to Gh, and the group correction-current generators 61*a* to 61*h* are provided for the groups Ga to Gh, respectively. To the group correction-current generators 61*a* to 61*h*, the individual reference-current generation correctors 62*a*5, 62*a*13, 62*a*21, 62*a*29, 62*a*37, . . . , 62*h*4, 62*h*12, 62*h*20, 62*h*28, and 62*h*36 are coupled.

Each of the group correction-current generators 61*a* to 61*h* outputs shading correction current to the individual reference-current generation correctors 62*a*5, 62*a*13, 62*a*21, 62*a*29, 62*a*37, . . . , 62*h*4, 62*h*12, 62*h*20, 62*h*28, and 62*h*36 that belong to the corresponding one of the groups Ga to Gh. Here, the level of the shading correction current is determined according to a shading-correction value prescribed for each of the laser-beam source units Ld1 to Ld40 that belong to the corresponding one of the groups Ga to Gh.

The individual reference-current generation correctors 62*a*5, 62*a*13, 62*a*21, 62*a*29, 62*a*37, . . . , 62*h*4, 62*h*12, 62*h*20, 62*h*28, and 62*h*36 generate reference current for the respective laser-beam source units Ld1 to Ld40 according to the image data. Moreover, the individual reference-current generation correctors 62*a*5, 62*a*13, 62*a*21, 62*a*29, 62*a*37, . . . , 62*h*4, 62*h*12, 62*h*20, 62*h*28, and 62*h*36 correct the reference current according to the shading correction current output from the group correction-current generators 61a to 61h.

Then, the individual reference-current generation correctors 62a5, 62a13, 62a21, 62a29, 62a37, ..., 62h4, 62h12, 62h20, 62h28, and 62h36 output the shading-corrected reference current to the individual adder circuits 64a5, 64a13, 64a21, 64a29, 64a37, ..., 64h4, 64h12, 64h20, 64h28, and 64h36, respectively.

The individual adjustment current generators 63a5, 63a13, 63a21, 63a29, 63a37, ..., 63h4, 63h12, 63h20, 63h28, and 63h36 generates adjustment current according to an adjustment value for adjusting the quantity of light to be emitted from the corresponding one of the laser-beam source units Ld1 to Ld40. The individual adjustment current generators 63a5, 63a13, 63a21, 63a29, 63a37, ..., 63h4, 63h12, 63h20, 63h28, and 63h36 outputs the adjustment current to the corresponding one of the individual adder circuits 64a5, 64a13, 64a21, 64a29, 64a37, ..., 64h4, 64h12, 64h20, 64h28, and 64h36. The individual adder circuits 64a5, 64a13, 64a21, 64a29, 64a37, ..., 64h4, 64h12, 64h20, 64h28, and 64h36 adds the adjustment current generated by the corresponding one of the individual adjustment current generators 63a5, 63a13, 63a21, 63a29, 63a37, ..., 63h4, 63h12, 63h20, 63h28, and 63h36 to the shading-corrected reference current generated by the corresponding one of the individual reference-current generation correctors 62a5, 62a13, 62a21, 62a29, 62a37, ..., 62h4, 62h12, 62h20, 62h28, and 62h36, and supplies the resultant current to the corresponding one of the laser-beam source units Ld1 to Ld40, as a final driving current.

Accordingly, while scanning is being performed in the main scanning direction, the image forming apparatus 1 can perform shading correction for each unit aligned in the sub-scanning direction using the semiconductor laser driver 60. As a result, without providing an individual shading correction circuit for each one of the laser-beam source units Ld1 to Ld40, low-cost shading correction can be performed to prevent vertical stripes from occurring.

As illustrated in FIG. 3, there are physical spaces between laser beams of, for example, the group Ga and the group Gh, in the main scanning direction. For this reason, if vertical stripes are corrected on a pixel-by-pixel basis by performing shading correction for all the laser-beam source units Ld1 to Ld40 in common, the formed dots become misaligned by the amount of the spaces between laser beams.

FIG. 5 is a diagram illustrating dot misalignment caused when shading correction is performed for all the laser beam sources at a common timing. For example, when dots are formed by the laser-beam source units Ld1 to Ld40 of the same channel at the same shading timing, for example, as illustrated in FIG. 5, dots with high density become misaligned in a quantity equal to the physical spaces between laser beams. FIG. 5 illustrates a state in which dots with high density become misaligned in a quantity equal to the physical spaces between laser beams when dots with high density are formed by the laser-beam source units Ld5, Ld6, Ld7, Ld8, Ld1, Ld2, Ld3, and Ld4 on the top row of each column at the same time with shading correction. Note also that FIG. 5 illustrates a case where the spaces between the laser-beam source units Ld1 to Ld40 in the arrangement are, for example, about 20 to 30 micrometers (um) and the gap of 1 to 1.5 dots of 1200 dots per inch (dpi).

FIG. 6 is a diagram illustrating dot misalignment caused when shading correction is performed for each group, according to the present embodiment. As illustrated in FIG. 6, the semiconductor laser driver 60 of the image forming apparatus 1 according to the present embodiment perform shading correction upon classifying the laser-beam source units Ld1 to Ld40 into the groups Ga to Gh.

Accordingly, shading correction can be performed for each one of the groups Ga to Gh, as illustrated in FIG. 6, and the dots can be prevented from being misaligned. As a result, vertical stripes or the like can be corrected even more appropriately, and the image quality improves.

In the above description, the group correction-current generators 61a to 61h, which serve as shading correction circuits, are provided for all the groups Ga to Gh. However, no limitation is intended thereby. For example, a group correction-current generator, i.e., a shading correction circuit, may be provided for every other group. In such a configuration, the circuit scale of the shading correction circuit can be reduced by half.

As described above, in the image forming apparatus 1 according to the present embodiment, the semiconductor laser driver 60 includes: the VCSEL (light source) 53 in which the sub-scanning direction serves as the channel direction (group direction), the multiple laser-beam source units Ld1 to Ld40 are disposed in the channel direction, the multiple channels (i.e., the groups Ga to Gh) of the laser-beam source units Ld1 to Ld40 are arranged in the main scanning direction, and each of the laser-beam source units Ld1 to Ld40 emits a laser beam of the light quantity dependent upon a driving current; the shading corrector composed of the group correction-current generators 61a to 61h and the individual reference-current generation correctors 62a5, 62a13, 62a21, 62a29, 62a37, ..., 62h4, 62h12, 62h20, 62h28, and 62h36 that correct, according to the shading correction value, the driving currents given to the laser-beam source units Ld1 to Ld40 for each of the channels (i.e., the groups Ga to Gh); and the light quantity adjuster composed of the individual adder circuits 64a5, 64a13, 64a21, 64a29, 64a37, ..., 64h4, 64h12, 64h20, 64h28, and 64h36, and the individual adjustment current generators 63a5, 63a13, 63a21, 63a29, 63a37, ..., 63h4, 63h12, 63h20, 63h28, and 63h36 that adjusts the driving currents according to light-quantity adjustment values for the respective laser-beam source units Ld1 to Ld40.

As a result, without providing an individual shading correction circuit for each one of the laser-beam source units Ld1 to Ld40, low-cost shading correction can be performed to prevent vertical stripes from occurring.

In the In the semiconductor laser driver 60 according to the present embodiment, a digital-analog converter is used for the light quantity adjuster and the shading corrector.

Accordingly, with a simplified configuration, low-cost shading correction can be performed to prevent vertical stripes from occurring.

Second Embodiment

Figure 7:
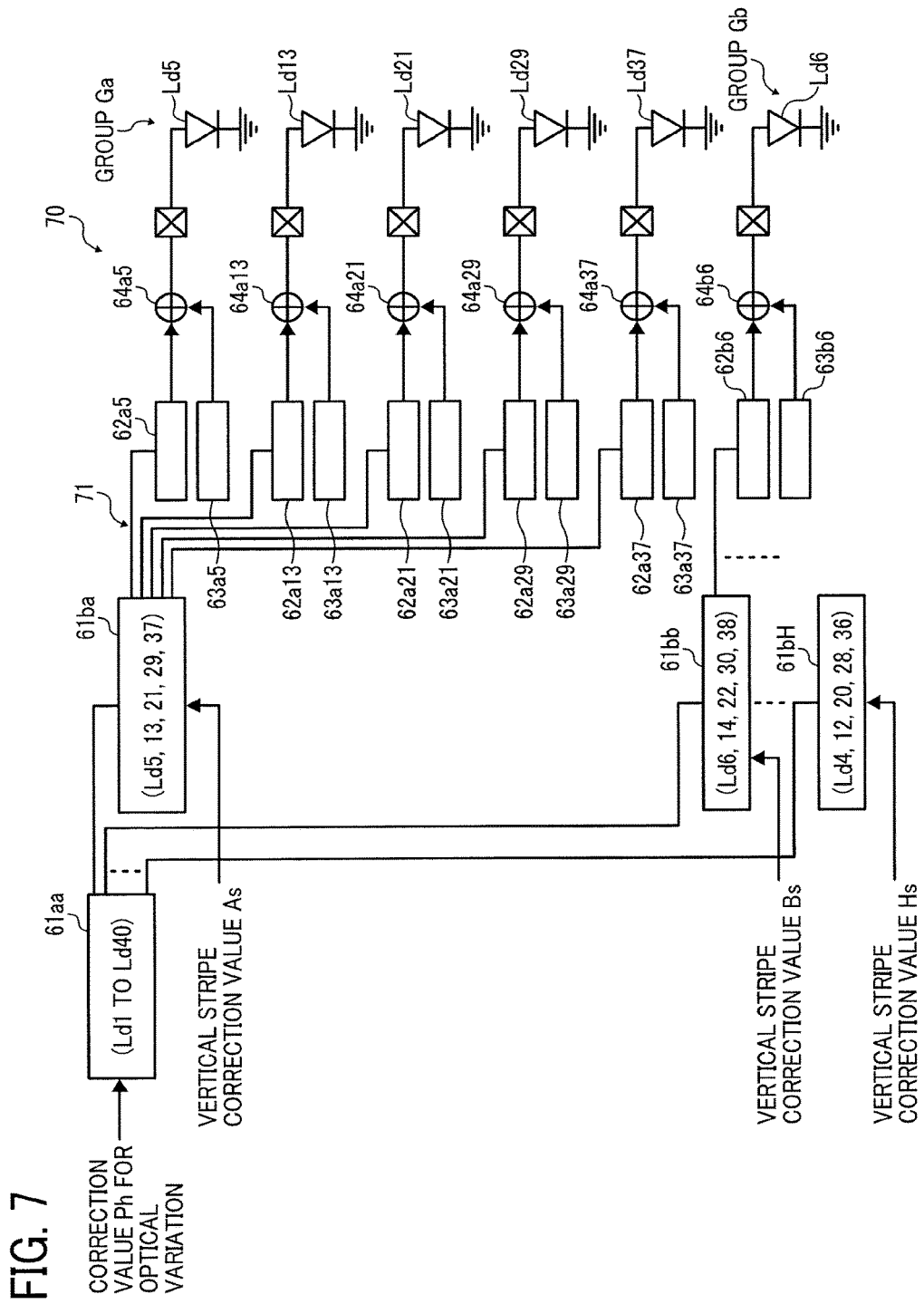
FIG. 7 is a schematic circuit diagram of a semiconductor laser driver according to a second embodiment of the present invention.
Figure 8:
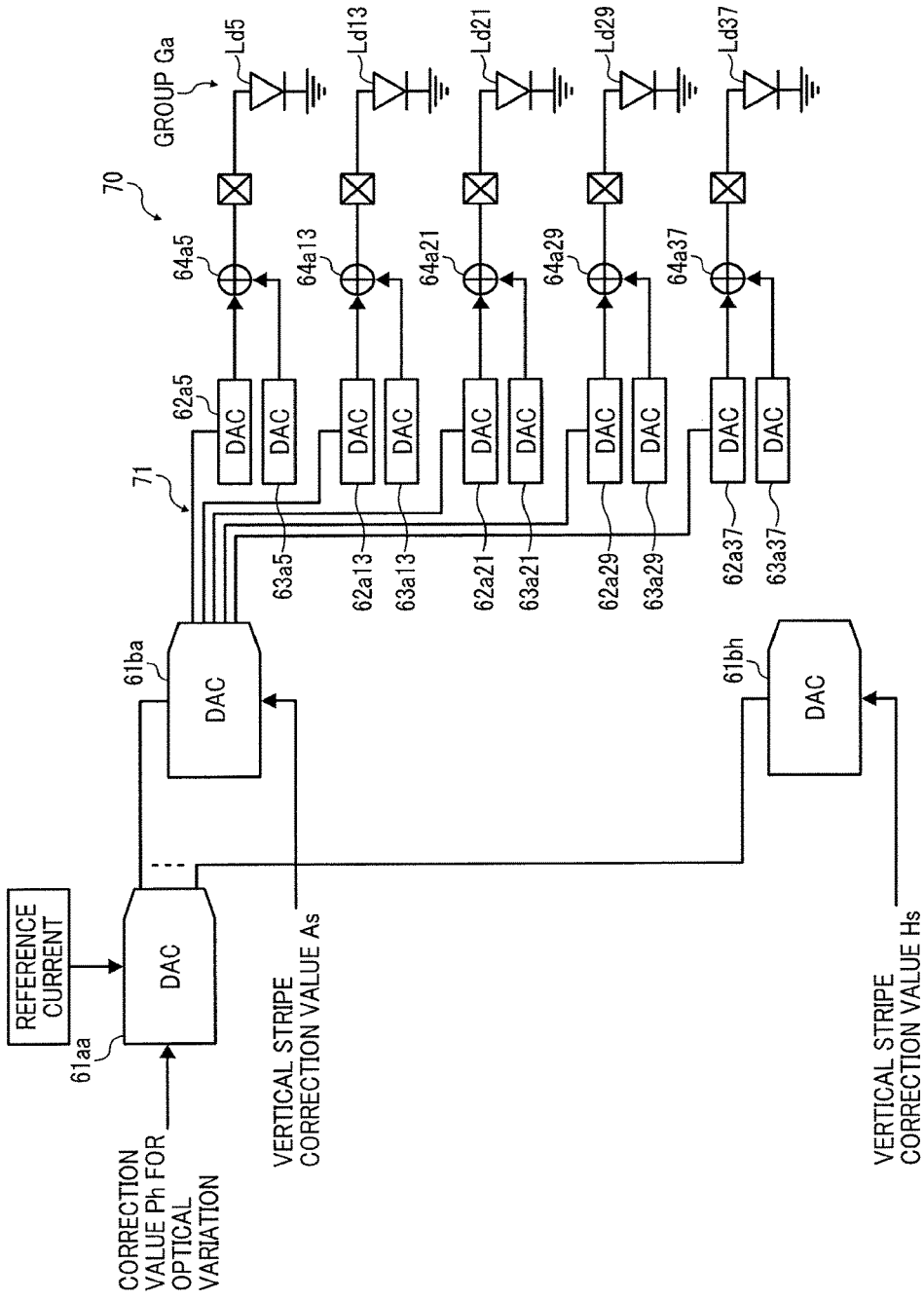
FIG. 8 is a schematic circuit diagram of actual implementation of the semiconductor laser driver of FIG. 7.

FIG. 7 and FIG. 8 are diagrams illustrating a semiconductor laser driver and an image forming apparatus incorporating the semiconductor laser driver, according to a second embodiment of the present invention. FIG. 7 is a schematic circuit diagram of a semiconductor-laser drive circuit 70 to which the semiconductor laser driver and the image forming apparatus incorporating the semiconductor laser driver are applied, according to the second embodiment of the present invention.

Note that the equivalent of the image forming apparatus 1 and the semiconductor laser driver 60 according to the present embodiment as described above is applied to the semiconductor-laser drive circuit 70. Note that like reference signs denote like elements in the description of the present embodiment for the purpose of simplification.

As illustrated in FIG. 7, in the semiconductor-laser drive circuit 70 according to the present embodiment, in a similar manner to the first embodiment, the laser-beam source units Ld1 to Ld40 are classified into the groups Ga to Gh for each column of laser-beam source units aligned in the sub-scanning direction.

The semiconductor-laser drive circuit 70 includes the drive controller 71, and the laser-beam source units Ld1 to Ld40 that are classified into the groups Ga to Gh.

In a similar manner to the first embodiment as above, the drive controller 71 includes, for the respective laser-beam source units Ld1 to Ld40, the individual reference-current generation correctors 62a5, 62a13, 62a21, 62a29, 62a37, . . . , 62h4, 62h12, 62h20, 62h28, and 62h36, the individual adjustment current generators 63a5, 63a13, 63a21, 63a29, 63a37, . . . , 63h4, 63h12, 63h20, 63h28, and 63h36, and the individual adder circuits 64a5, 64a13, 64a21, 64a29, 64a37, . . . , 64h4, 64h12, 64h20, 64h28, and 64h36. Moreover, the drive controller 71 includes an optical-system correction current generator 61aa, and vertical-stripe correction current generators 61ba to 61bh for groups Ga to Gh.

The optical-system correction current generator 61aa outputs, to each of the vertical-stripe correction current generators 61ba to 61bh, optical-system correction current for correcting regular optical variation. Note that the optical-system correction current corresponds to a correction value Ph and is applied to all the laser-beam source units Ld1 to Ld40 in common. In other words, the optical-system correction current generator 61aa serves as a first shading corrector.

Each of the vertical-stripe correction current generators 61ba to 61bh adds a vertical-stripe correction current according to corresponding one of vertical-stripe correction values As to Hs given for the respective groups Ga to Gh to the optical-system correction current output from the optical-system correction current generator 61aa, and outputs the obtained current to the individual reference-current generation correctors 62a5, 62a13, 62a21, 62a29, 62a37, . . . , 62h4, 62h12, 62h20, 62h28, and 62h36 that belong to the corresponding one of the groups Ga to Gh. In other words, the vertical-stripe correction current generators 61ba to 61bh serve as a second shading corrector.

In a similar manner to the first embodiment as above, each of the individual reference-current generation correctors 62a5, 62a13, 62a21, 62a29, 62a37, . . . , 62h4, 62h12, 62h20, 62h28, and 62h36 corrects the reference current to be generated, according to the shading correction current output from the corresponding one of the group correction-current generators 61a to 61h.

In a similar manner to the first embodiment, the individual adjustment current generators 63a5, 63a13, 63a21, 63a29, 63a37, . . . , 63h4, 63h12, 63h20, 63h28, and 63h36 generates adjustment current according to an adjustment value for adjusting the quantity of light to be emitted from the corresponding one of the laser-beam source units Ld1 to Ld40.

In a similar manner to the first embodiment as above, each of the individual adder circuits 64a5, 64a13, 64a21, 64a29, 64a37, . . . , 64h4, 64h12, 64h20, 64h28, and 64h36 adds the adjustment current generated by the corresponding one of the individual adjustment current generators 63a5, 63a13, 63a21, 63a29, 63a37, . . . , 63h4, 63h12, 63h20, 63h28, and 63h36 to the shading-corrected reference current generated by the corresponding one of the individual reference-current generation correctors 62a5, 62a13, 62a21, 62a29, 62a37, . . . , 62h4, 62h12, 62h20, 62h28, and 62h36. Then, each of the individual adder circuits 64a5, 64a13, 64a21, 64a29, 64a37, . . . , 64h4, 64h12, 64h20, 64h28, and 64h36 supplies the resultant current to the corresponding one of the laser-beam source units Ld1 to Ld40, as a final driving current.

In the actual implementation, the semiconductor-laser drive circuit 70 illustrated in FIG. 7 is integrated as illustrated in FIG. 8. In other words, in the semiconductor-laser drive circuit 70, digital-analog converters (DAC) are used for the optical-system correction current generator 61aa and the vertical-stripe correction current generators 61ba to 61bh. In the semiconductor-laser drive circuit 70, the individual reference-current generation correctors 62a5, 62a13, 62a21, 62a29, 62a37, . . . , 62h4, 62h12, 62h20, 62h28, and 62h36, the individual adjustment current generators 63a5, 63a13, 63a21, 63a29, 63a37, . . . , 63h4, 63h12, 63h20, 63h28, and 63h36, and the individual adder circuits 64a5, 64a13, 64a21, 64a29, 64a37, . . . , 64h4, 64h12, 64h20, 64h28, and 64h36 may also be implemented by digital-analog converters.

Figure 9:
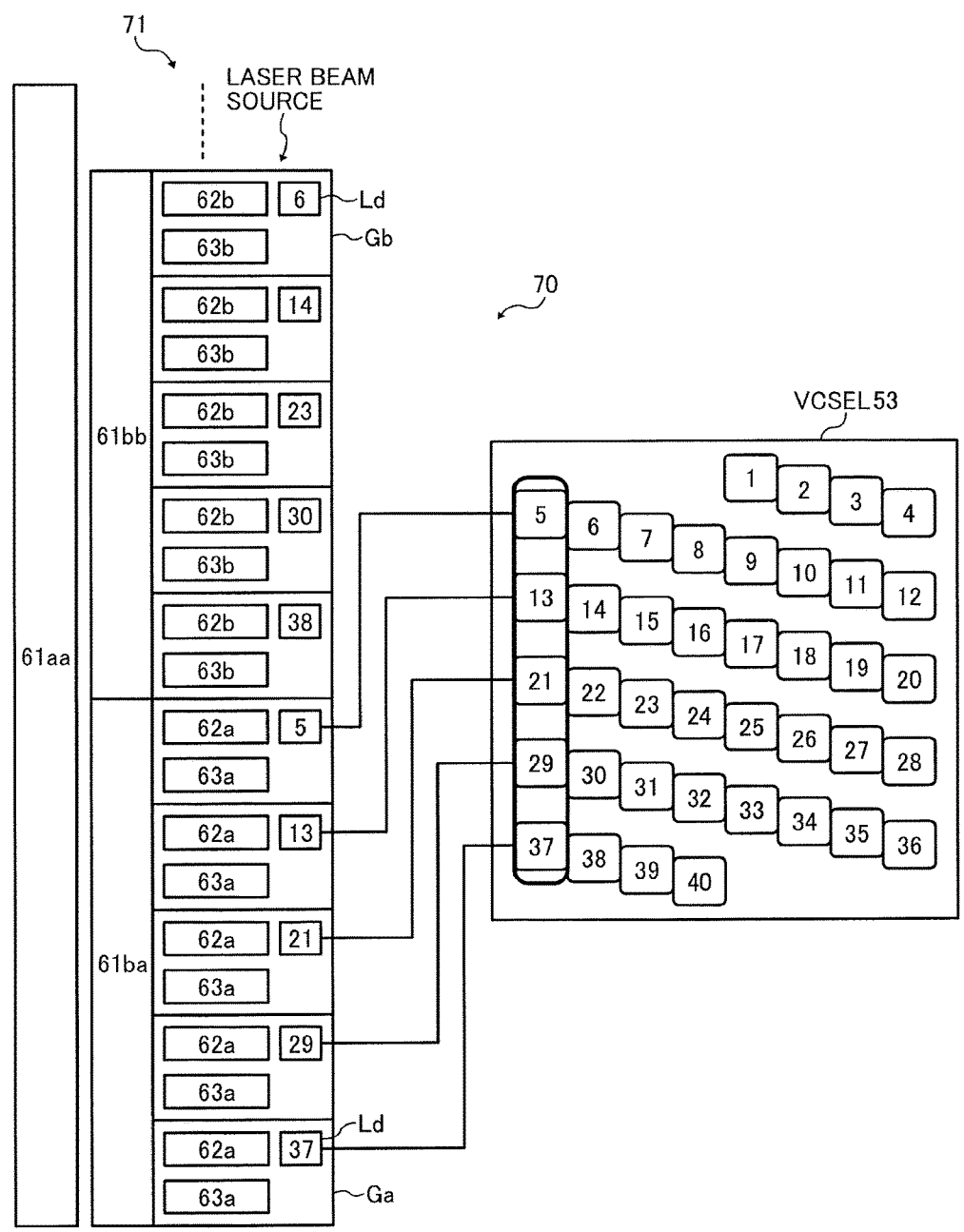
FIG. 9 is a diagram illustrating a semiconductor laser driver mounted on a semiconductor chip, according to an embodiment of the present invention.

FIG. 9 is a diagram illustrating the semiconductor-laser drive circuit 70 mounted on a semiconductor chip, according to the present embodiment. When the semiconductor-laser drive circuit 70 is configured as one chip of semiconductor, as illustrated in FIG. 9, the individual reference-current generation correctors 62a5, 62a13, 62a21, 62a29, 62a37, . . . , 62h4, 62h12, 62h20, 62h28, and 62h36, the individual adjustment current generators 63a5, 63a13, 63a21, 63a29, 63a37, . . . , 63h4, 63h12, 63h20, 63h28, and 63h36, and the individual adder circuits 64a5, 64a13, 64a21, 64a29, 64a37, . . . , 64h4, 64h12, 64h20, 64h28, and 64h36 of the drive controller 71 are laid out in accordance with the groups Ga to Gh to improve reduction in size.

In FIG. 9, for each one of the groups Ga to Gh including the laser-beam source units Ld1 to Ld40, the individual reference-current generation correctors 62a5, 62a13, 62a21, 62a29, 62a37, . . . , 62h4, 62h12, 62h20, 62h28, and 62h36, the individual adjustment current generators 63a5, 63a13, 63a21, 63a29, 63a37, . . . , 63h4, 63h12, 63h20, 63h28, and 63h36, and the individual adder circuits 64a5, 64a13, 64a21, 64a29, 64a37, . . . , 64h4, 64h12, 64h20, 64h28, and 64h36 are integrated. Note that in FIG. 9, the illustration of the individual adder circuits 64a5, 64a13, 64a21, 64a29, 64a37, . . . , 64h4, 64h12, 64h20, 64h28, and 64h36 is omitted.

The circuits of the laser-beam source units Ld1 to Ld40 are classified into the groups Ga to Gh, and coupled to the vertical-stripe correction current generators 61ba to 61bh and further coupled to the optical-system correction current generator 61aa.

Due to this configuration, the one chip of semiconductor laser can further be downsized.

In the semiconductor-laser drive circuit 70 according to the present embodiment, the drive controller 71 includes one optical-system correction current generator 61aa, and the vertical-stripe correction current generators 61ba to 61bh each of which is provided for each of the groups Ga to Gh. Note that the optical-system correction current generator 61aa corrects nonspecific optical variation, and the vertical-stripe correction current generators 61ba to 61bh are dedicated to correct the vertical stripes only. Here, as known in the art, the range of light quantity for correcting vertical stripes is narrower than the range of light quantity for correcting a nonspecific optical variation. In order to handle such a situation, in the present embodiment, the optical-system correction current generator 61aa, which is a single unit, is provided to cover a wide range of light quantity for correction, and the vertical-stripe correction current generators 61*ba* to 61*bh*, which are a plurality of units, are provided for the groups Ga to Gh, respectively, to cover a narrow range of light quantity for correction.

Accordingly, the scale of the circuit can further be prevented from increasing.

In the present embodiment, the drive controller 71 uses the optical-system correction current generator 61*aa*, which is a single unit, to correct a nonspecific optical variation. However, the drive controller 71 may be provided with a plurality of optical-system correction current generators 61*aa* to correct a nonspecific optical variation upon classifying the laser-beam source units Ld1 to Ld40 into several groups.

As described above, in the semiconductor-laser drive circuit 70 according to the present embodiment, the shading corrector includes: the optical-system correction current generator (i.e., the first shading corrector) 61*aa* that simultaneously performs shading correction on the driving currents supplied to all the laser-beam source units Ld1 to Ld40 or selected ones of the laser-beam source units Ld1 to Ld40; and the vertical-stripe correction current generators (i.e., the second shading corrector) 61*ba* to 61*bh* that perform shading correction on the driving currents supplied to the laser-beam source units Ld1 to Ld40 for each one of the channels (i.e., the groups Ga to Gh). Note also that the optical-system correction current generator 61*aa* and the vertical-stripe correction current generators 61*ba* to 61*bh* are coupled to each other in series.

Accordingly, shading correction can be performed to prevent vertical stripes from occurring even more appropriately, and the cost and the scale of the circuit can also be reduced.

In the semiconductor-laser drive circuit 70 according to the present embodiment, the optical-system correction current generator 61*aa* uses a shading correction value greater than that of the vertical-stripe correction current generators 61*ba* to 61*bh* to correct a driving current.

Accordingly, shading correction can be performed to prevent vertical stripes from occurring even more appropriately, and the scale of the circuit can further be reduced.

Further, in the semiconductor-laser drive circuit 70 according to the present embodiment, the vertical-stripe correction current generators 61*ba* to 61*bh* correct driving currents at a rate faster than the rate at which the optical-system correction current generator 61*aa* corrects a driving current.

Accordingly, shading correction on the driving currents can be performed smoothly, and shading correction can be performed speedily to prevent vertical stripes from occurring even more appropriately, and the scale of the circuit can further be reduced.

In the semiconductor-laser drive circuit 70 according to the present embodiment, a digital-analog converter is used for the first shading corrector and the second shading corrector.

Accordingly, shading correction can be performed with simplified configuration to prevent vertical stripes from occurring even more appropriately, and the cost can also be reduced.

Further, in the semiconductor-laser drive circuit 70 according to the present embodiment, the laser-beam source units Ld1 to Ld40 are combined together for each of the channels (i.e., the groups Ga to Gh), and are built on an end face of a semiconductor device, and the shading corrector is built on the semiconductor device in a state where the outputs of the shading correctors are coupled to the laser-beam source units Ld1 to Ld40 on a channel-by-channel basis.

Accordingly, the semiconductor device that configures the semiconductor-laser drive circuit 70 can be downsized, and shading correction can be performed with a small semiconductor device to prevent vertical stripes from occurring even more appropriately.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A semiconductor laser driver comprising:
a light source including a plurality of laser-beam emitters that are arranged into a plurality of groups, each group including laser-beam emitters disposed in a sub-scanning direction that serves as a group direction, the plurality of groups being arranged in a main scanning direction different from the sub-scanning direction, and each of the laser-beam emitters being configured to emit a laser beam of a light quantity dependent upon a respective driving current;
a shading correction circuit configured to generate, according to at least one shading correction value, reference driving currents for the laser-beam emitters in one of the groups, respectively; and
a light quantity adjuster adjustment circuit configured to adjust a respective one of the reference driving currents according to a light-quantity adjustment value as a driving current for one of the laser-beam emitters in the one of the groups.

2. The semiconductor laser driver according to claim 1, wherein
the shading correction circuit comprises:
a first shading corrector configured to generate group reference currents for a part of or all of the plurality of groups, respectively; and
a second shading corrector configured to generate the reference driving currents for the laser-beam emitters in the one of the groups based on a respective one of the group reference currents,
wherein the first shading corrector and the second shading corrector are coupled in series.

3. The semiconductor laser driver according to claim 2, wherein
the at least one shading correction value comprises a first shading correction value and a second shading correction value,
the first shading corrector is configured to generate the group reference currents according to the first shading correction value that is greater than the second shading correction value, and
the second shading corrector is configured to generate the reference driving currents according to the second shading correction value.

4. The semiconductor laser driver according to claim 2, wherein
the second shading corrector is configured to adjust the driving current for a particular laser-beam emitter at a rate faster than a rate at which the first shading corrector is configured to adjust the driving current.

5. The semiconductor laser driver according to claim 2, wherein
the first shading corrector and the second shading corrector are implemented using a digital-analog converter.

6. The semiconductor laser driver according to claim 5, wherein
the laser-beam emitters are formed on a semiconductor device, and
the shading correction circuit is formed on the semiconductor device.

7. An image forming apparatus comprising:
a semiconductor laser drive circuit to form an image by irradiating a photoconductor with laser beams according to image data; and
the semiconductor laser driver according to claim 6.

8. The semiconductor laser driver according to claim 1, wherein
the light quantity adjustment circuit and the shading correction circuit are implemented using a digital-analog converter.

9. The semiconductor laser driver according to claim 1, wherein
the laser-beam emitters are formed on a semiconductor device, and
the shading correction circuit is formed on the semiconductor device.

10. An image forming apparatus comprising:
a semiconductor laser drive circuit to form an image by irradiating a photoconductor with laser beams according to image data; and
the semiconductor laser driver according to claim 9.

11. An image forming apparatus comprising:
a semiconductor laser drive circuit configured to form an image by irradiating a photoconductor with laser beams according to image data; and
a semiconductor laser driver comprising
a light source including a plurality of laser-beam emitters that are arranged into a plurality of groups, each group including laser-beam emitters disposed in a sub-scanning direction that serves as a group direction, the plurality of groups being arranged in a main scanning direction different from the sub-scanning direction, and each of the laser-beam emitters being configured to emit a respective one of the laser beams of a light quantity dependent upon a respective driving current,
a shading correction circuit configured to generate, according to at least one shading correction value, reference driving currents for the laser-beam emitters in one of the groups, respectively, and
a light quantity adjustment circuit configured to adjust a respective one of the driving currents according to a light-quantity adjustment value as a driving current for the laser-beam emitters in the one of the groups.

12. An image forming apparatus comprising:
a semiconductor laser drive circuit to form an image by irradiating a photoconductor with laser beam according to image data; and
a semiconductor laser driver comprising
a light source including a plurality of laser-beam source units disposed in a sub-scanning direction that serves as a group direction, the laser-beam source units having a plurality of groups arranged in a main scanning direction, each of the laser-beam source units emitting a laser beam of a light quantity dependent upon a driving current,
a shading corrector to correct, according to at least one shading correction value, the driving current given to the laser-beam source units for each of the groups, and
a light quantity adjuster to adjust the driving current according to a light-quantity adjustment value for the laser-beam source units,
wherein
the shading corrector includes
a first shading corrector to simultaneously perform shading correction on the driving current supplied to a part of or all of the plurality of laser-beam source units, and
a second shading corrector to perform shading correction on the driving current supplied to the laser-beam source units for each of the groups,
the first shading corrector and the second shading corrector are coupled in series, and
the first shading corrector and the second shading corrector use a digital-analog converter.

* * * * *